(12) United States Patent
Moon et al.

(10) Patent No.: US 8,607,574 B1
(45) Date of Patent: Dec. 17, 2013

(54) TURBINE ENGINE EXHAUST NOZZLE FLAP

(75) Inventors: Francis R. Moon, Granby, CT (US); Claude I. Barnett, Jr., Lebanon, CT (US); Jeffrey M. Jacques, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/493,664

(22) Filed: Jun. 11, 2012

(51) Int. Cl.
*F02K 1/00* (2006.01)

(52) U.S. Cl.
USPC ............... 60/770; 239/265.11; 239/265.39

(58) Field of Classification Search
USPC .......... 60/232, 770, 771; 239/265.11, 265.19, 239/265.33, 265.37, 265.39, 265.43
See application file for complete search history.

(56) References Cited

U.S. PATENT DOCUMENTS

| | | | |
|---|---|---|---|
| 5,141,154 A | 8/1992 | Barcza | |
| 5,265,409 A | 11/1993 | Smith, Jr. et al. | |
| 2,585,637 A | 2/1994 | Barczq | |
| 5,398,499 A * | 3/1995 | Urruela | 60/232 |
| 5,528,904 A | 6/1996 | Jones et al. | |
| 5,690,279 A | 11/1997 | Kramer et al. | |
| 6,418,709 B1 | 7/2002 | Narcus et al. | |
| 7,624,579 B2 | 12/2009 | Peters | |
| 7,757,477 B2 | 7/2010 | Kehret et al. | |
| 7,770,399 B2 | 8/2010 | Burdick et al. | |
| 7,802,431 B2 | 9/2010 | Parker | |
| 7,814,753 B2 | 10/2010 | Farah et al. | |
| 7,866,158 B2 | 1/2011 | Murphy | |
| 7,866,939 B2 | 1/2011 | Harper et al. | |
| 7,871,242 B2 | 1/2011 | Swanson et al. | |
| 2007/0062199 A1 * | 3/2007 | Cowan et al. | 60/770 |
| 2010/0278641 A1 | 11/2010 | Boman | |
| 2010/0290892 A1 | 11/2010 | Schwaller | |

* cited by examiner

*Primary Examiner* — William H Rodriguez
*Assistant Examiner* — Scott Walthour
(74) *Attorney, Agent, or Firm* — O'Shea Getz P.C.

(57) ABSTRACT

An exhaust nozzle flap for a turbine engine may include an exhaust nozzle flap linkage, an exhaust nozzle flap panel and a mounting pin. The linkage may include a first linkage segment that extends longitudinally from a linkage end to a second linkage segment, and a mounting aperture that extends transversely through the second linkage segment. The panel may include a first panel segment that extends longitudinally from a panel end to a second panel segment. The first panel segment may be pivotally engaged with the first linkage segment. The mounting pin may extend through and move transversely within the mounting aperture, and may be connected to the second panel segment.

17 Claims, 4 Drawing Sheets

TURBINE ENGINE EXHAUST NOZZLE FLAP

This invention was made with government support under Contract No. N00019-02-C-3003 awarded by the United States Navy. The government may have certain rights in the invention.

BACKGROUND OF THE INVENTION

1. Technical Field

The present invention relates to a turbine engine and, in particular, to a turbine engine exhaust nozzle that includes one or more exhaust nozzle flaps.

2. Background Information

A variable geometry exhaust nozzle for a gas turbine engine may include a plurality of convergent flaps connected between an exhaust nozzle case and a plurality of divergent flaps. The exhaust nozzle may also include a plurality of convergent seals. Each convergent seal may be arranged circumferentially between and sealingly engaged with adjacent convergent flaps. Each convergent seal may include a seal panel and a seal frame. The seal panel may be fixedly connected to the seal frame at a forward frame end and an aft frame end. The forward frame end may be pivotally connected to the exhaust nozzle case, and the aft frame end may be pivotally connected to a respective divergent seal arranged between adjacent divergent flaps.

The convergent flaps and the divergent flaps may move radially between an unrestricted flow configuration and a restricted flow configuration during exhaust nozzle operation. The fixed connection between the seal panel and the seal frame, however, may cause a forward end of the seal panel to disengage with a seal land on the exhaust nozzle case during at least a portion of the aforesaid exhaust nozzle movement. Core air may therefore leak into the exhaust nozzle during the exhaust nozzle movement, which may reduce engine efficiency and damage exhaust nozzle actuation components.

SUMMARY OF THE DISCLOSURE

According to a first aspect of the invention, an exhaust nozzle flap for a turbine engine includes an exhaust nozzle flap linkage, an exhaust nozzle flap panel and a mounting pin. The linkage includes a first linkage segment that extends longitudinally from a linkage end to a second linkage segment, and a mounting aperture that extends transversely through the second linkage segment. The panel includes a first panel segment that extends longitudinally from a panel end to a second panel segment. The first panel segment is pivotally engaged with the first linkage segment. The mounting pin extends through and moves transversely within the mounting aperture, and is connected to the second panel segment.

In one embodiment, the second panel segment moves transversely relative to the second linkage segment, and the panel end is substantially transversely fixed relative to the linkage end.

In one embodiment, the mounting aperture has a longitudinally elongated cross-sectional geometry with a longitudinal aperture length, and the mounting pin has a longitudinal pin length that is less than the longitudinal aperture length. In some embodiments, the elongated cross-sectional geometry is an oval cross-sectional geometry, and the pin has a circular cross-sectional geometry.

In one embodiment, the exhaust nozzle flap panel is configured as a heat shield.

In one embodiment, exhaust nozzle flap also includes a panel mount connected to the first panel segment, wherein the first linkage segment is pivotally mounted to the panel mount.

In one embodiment, the exhaust nozzle flap linkage also includes a first cross rail that extends laterally between a first base rail and a second base rail. The mounting aperture is arranged with the first cross rail. The first base rail and the second base rail extend longitudinally between the linkage end and a second linkage end. In some embodiments, the first cross rail is one of a plurality of cross rails included in the exhaust nozzle flap linkage, and the first cross rail is arranged longitudinally between a second of the plurality of cross rails and a third of the plurality of cross rails.

In one embodiment, the exhaust nozzle flap linkage also includes a plurality of cross rails that extend laterally between a first base rail and a second base rail. The plurality of cross rails are arranged together to form a support truss, and the mounting aperture is arranged with at least one of the plurality of cross rails. The first base rail and the second base rail extend longitudinally between the linkage end and a second linkage end.

In one embodiment, the exhaust nozzle flap linkage also includes a distal third linkage segment that extends longitudinally between a second linkage end and the second linkage segment, and a second mounting aperture that extends laterally through the third linkage segment at the second linkage end. The exhaust nozzle flap panel also includes a distal third panel segment that extends longitudinally between a second panel end and the second panel segment.

According to a second aspect of the invention, a turbine engine exhaust nozzle includes a plurality of exhaust nozzle flaps arranged circumferentially around a centerline. A first of the plurality of exhaust nozzle flaps includes a linkage, a panel and a mounting pin. The linkage includes a first linkage segment that extends longitudinally from a linkage end to a second linkage segment, and a mounting aperture that extends transversely through the second linkage segment. The panel includes a first panel segment that extends longitudinally from a panel end to a second panel segment. The first panel segment is pivotally engaged with the first linkage segment. The mounting pin extends through and moves transversely within the mounting aperture, and is connected to the second panel segment.

In one embodiment, the second panel segment moves transversely relative to the second linkage segment, and the panel end is substantially transversely fixed relative to the linkage end.

In one embodiment, the first of the plurality of exhaust nozzle flaps is a convergent seal that is arranged circumferentially between and sealingly engaged with a second of the plurality of exhaust nozzle flaps and a third of the plurality of exhaust nozzle flaps.

In one embodiment, the mounting aperture has a longitudinally elongated cross-sectional geometry with a longitudinal aperture length, and the mounting pin has a longitudinal pin length that is less than the longitudinal aperture length.

In one embodiment, the turbine engine exhaust nozzle also includes a panel mount connected to the first panel segment, wherein the first linkage segment is pivotally mounted to the panel mount.

In one embodiment, the linkage also includes a first cross rail that extends laterally between a first base rail and a second base rail. The mounting aperture is arranged with the first cross rail. The first base rail and the second base rail extend longitudinally between the linkage end and a second linkage end. In some embodiments, the first cross rail is one of a plurality of cross rails included in the linkage, and the first cross rail is arranged longitudinally between a second of the plurality of cross rails and a third of the plurality of cross rails.

In one embodiment, the turbine engine exhaust nozzle also includes a convergent exhaust nozzle section connected between an exhaust nozzle case and a divergent exhaust nozzle section, wherein the convergent exhaust nozzle section includes the plurality of exhaust nozzle flaps. In some embodiments, the linkage also includes a third linkage segment that extends longitudinally between a second linkage end and the second linkage segment. The panel also includes a distal third panel segment that extends longitudinally between a second panel end and the second panel segment. The first linkage segment is pivotally connected to the convergent exhaust nozzle section at the linkage end, and the third linkage segment is pivotally connected to the exhaust nozzle case at the second linkage end.

The foregoing features and the operation of the invention will become more apparent in light of the following description and the accompanying drawings.

DETAILED DESCRIPTION OF THE INVENTION

Figure 1:
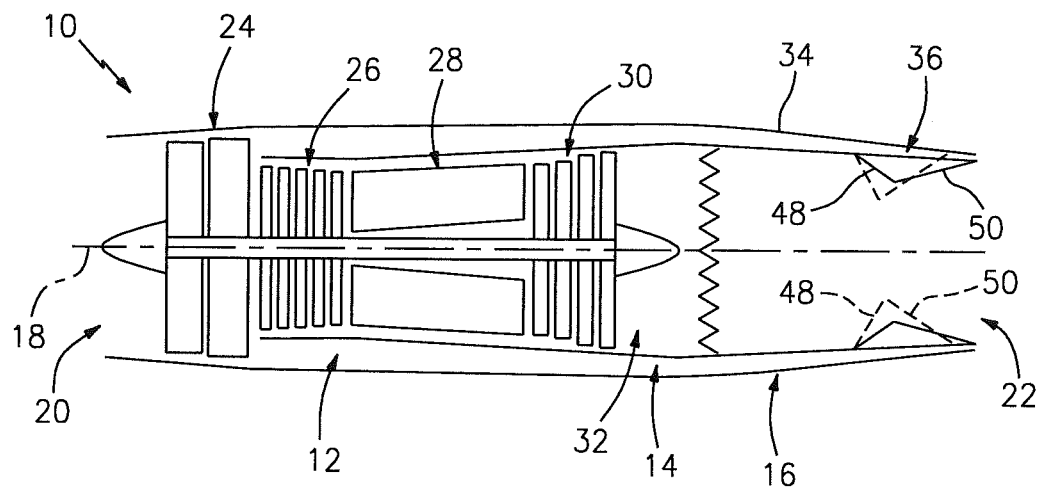
FIG. 1 is a side-sectional illustration of a gas turbine engine.

FIG. 1 is a side-sectional illustration of a gas turbine engine 10. The engine 10 includes an engine core 12, an augmentor (e.g., afterburner) section 14 and an exhaust nozzle section 16 that are sequentially arranged along an axial centerline 18 between an engine airflow inlet 20 and an engine airflow outlet 22. The engine core 12 may include a fan section 24, a compressor section 26, a combustor section 28 and a turbine section 30. The engine 10 also includes a central gas path 32 that extends axially through the engine core 12, the augmentor section 14 and the exhaust nozzle section 16 between the engine airflow inlet 20 and the engine airflow outlet 22.

The exhaust nozzle section 16 may include an exhaust duct 34 connected to a (e.g., variable geometry) exhaust nozzle 36. An example of an exhaust duct is a multi bearing swivel exhaust duct as disclosed in U.S. Pat. No. 7,814,753, which is hereby incorporated by reference in its entirety, and is assigned to the assignee of the present invention. The present invention, however, is not limited to any particular exhaust duct configuration.

Figure 2:
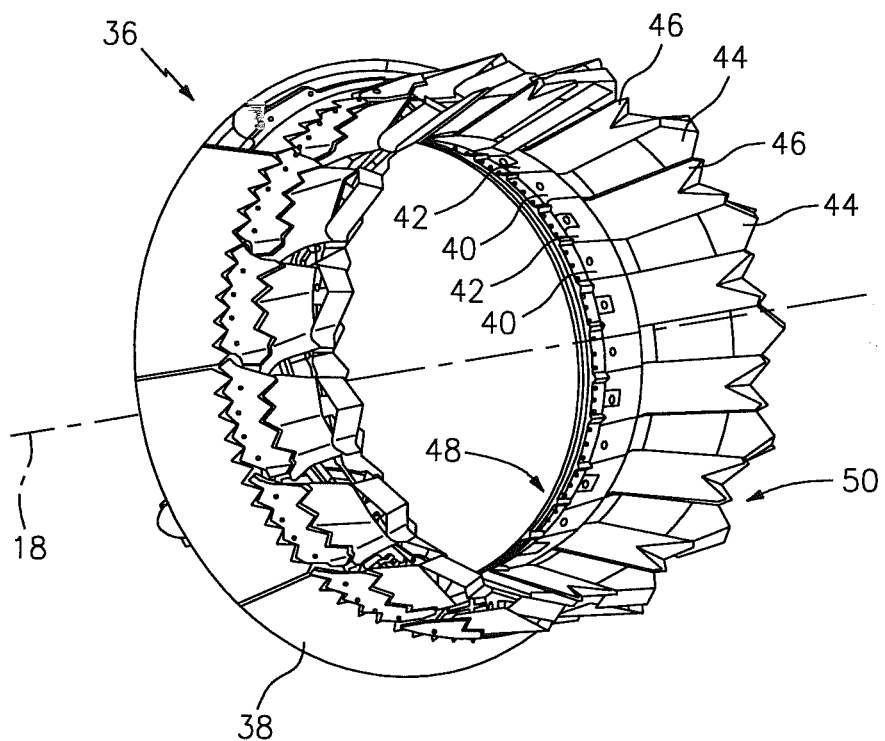
FIG. 2 is a perspective illustration of a gas turbine engine exhaust nozzle.

Referring to FIG. 2, the exhaust nozzle 36 may include an exhaust nozzle case 38 (e.g., annular) and a plurality of exhaust nozzle flaps (e.g., 40, 42, 44 and 46). The exhaust nozzle flaps (e.g., 40, 42, 44 and 46) may be arranged circumferentially around the axial centerline 18, and configured into a convergent exhaust nozzle section 48 and/or a divergent exhaust nozzle section 50. The flaps within the convergent exhaust nozzle section 48 may include the exhaust nozzle flaps 40 (e.g., convergent driving member flaps) and the exhaust nozzle flaps 42 (e.g., convergent following member seals), which flaps 42 are referred to below as "convergent seals" for ease of description. Each of the convergent seals 42 may be arranged circumferentially between and sealingly engaged with adjacent exhaust nozzle flaps 40. The flaps within the divergent exhaust nozzle section 50 may include the exhaust nozzle flaps 44 (e.g., divergent driving member flaps) and the exhaust nozzle flaps 46 (e.g., divergent following member seals), which flaps 46 are referred to below as "divergent seals" for ease of description. Each of the divergent seals 46 may be arranged circumferentially between and sealingly engaged with adjacent exhaust nozzle flaps 44. Alternative examples of exhaust nozzle configurations and exhaust nozzle flap geometries are disclosed in U.S. Pat. Nos. 7,770,399, 7,757,477, 7,624,579, 5,285,637 and 5,141,154, which are hereby incorporated by reference in their entirety, and are assigned to the assignee of the present invention. The present invention, however, is not limited to any particular exhaust nozzle configuration or exhaust nozzle flap geometry.

Figure 3:
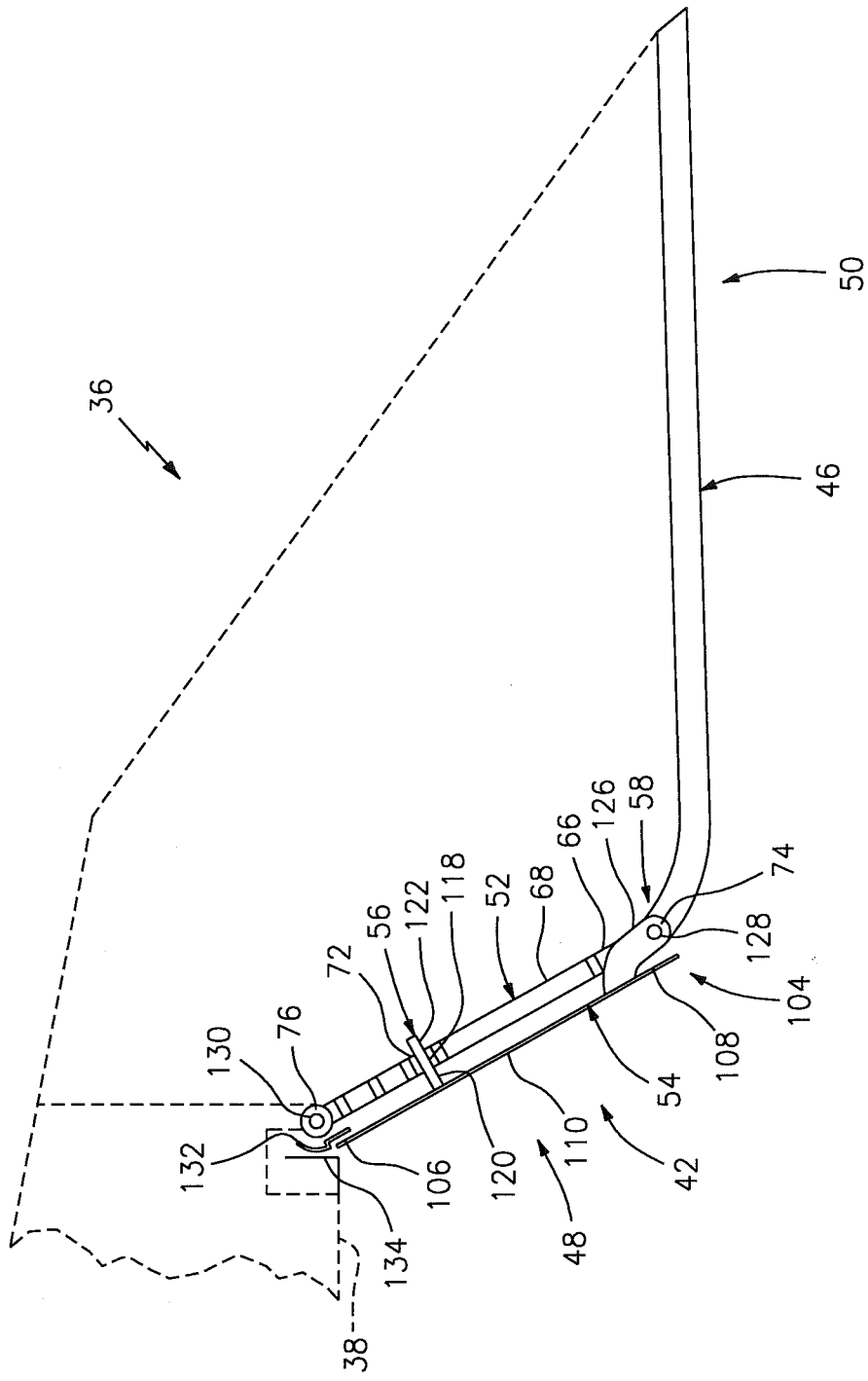
FIG. 3 is an enlarged side-sectional illustration of a portion of a gas turbine engine exhaust nozzle.
Figure 4:
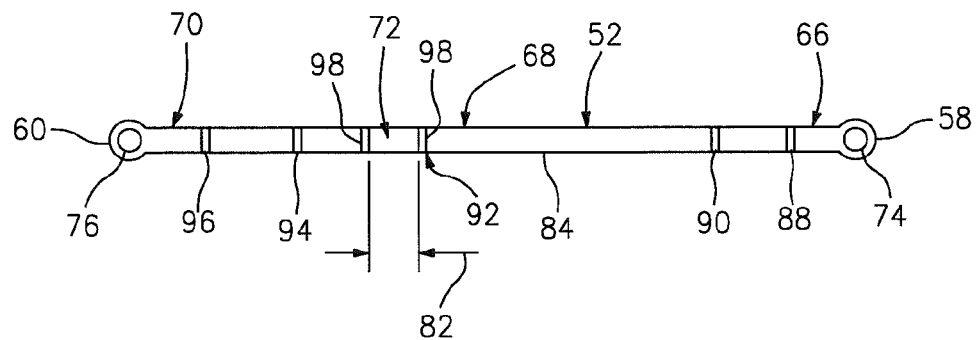
FIG. 4 is a side-sectional illustration of an exhaust nozzle flap linkage.
Figure 5:
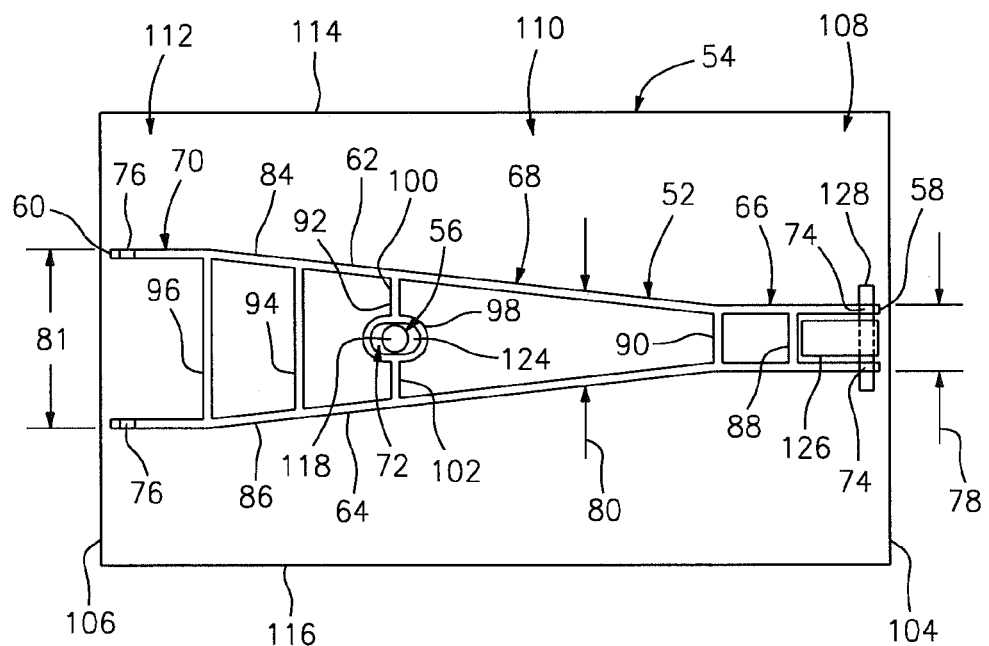
FIG. 5 is top view illustration of an exhaust nozzle flap linkage configured with an exhaust nozzle flap panel.

Referring to FIG. 3, one or more of the exhaust nozzle flaps (e.g., the convergent seals 42) may each include an exhaust nozzle flap linkage 52 (e.g., a tapered seal linkage), an exhaust nozzle flap panel 54 (e.g., heat shield seal panel) and a first mounting pin 56. Referring to FIG. 4, the linkage 52 may extend longitudinally (e.g., axially) between a first (e.g., aft) linkage end 58 and a second (e.g., forward) linkage end 60. Referring to FIG. 5, the linkage 52 may extend laterally (e.g., circumferentially) between a first linkage side 62 and a second linkage side 64. The linkage 52 may include a plurality of linkage segments (e.g., 66, 68 and 70), a panel mounting aperture 72 and one or more linkage mounting apertures (e.g., 74 and 76).

The linkage segments may include a first (e.g., aft) linkage segment 66, a second (e.g., intermediate) linkage segment 68 and a distal third (e.g., forward) linkage segment 70. The first linkage segment 66 may extend longitudinally from the first linkage end 58 to the second linkage segment 68. The first linkage segment 66 may have a (e.g., substantially uniform) first segment width 78 that extends laterally between the first linkage side 62 and the second linkage side 64. The second linkage segment 68 may extend longitudinally from the first linkage segment 66 to the third linkage segment 70. The second linkage segment 68 may have a second segment width 80 that extends laterally between the first linkage side 62 and the second linkage side 64, and changes (e.g., increases) as the segment 68 extends towards the third linkage segment 70. The third linkage segment 70 may extend longitudinally from the second linkage segment 68 to the second linkage end 60. The third linkage segment 70 may have a (e.g., substantially uniform) third segment width 81 that extends laterally between the first linkage side 62 and the second linkage side 64, and is different (e.g., greater) than the first segment width 78.

Referring to FIGS. 4 and 5, the panel mounting aperture 72 may extend transversely (e.g., radially) through the second linkage segment 68. The panel mounting aperture 72 may be configured with a longitudinally elongated (e.g., oval) cross-sectional geometry having a longitudinal aperture length 82. The first linkage mounting aperture 74 may extend laterally through the first linkage segment 66 at, for example, the first linkage end 58. The second linkage mounting aperture 76 may extend laterally through the third linkage segment 70 at, for example, the second linkage end 60.

The linkage 52 may be configured from a first base rail 84, a second base rail 86 and one or more cross rails (e.g., 88, 90, 92, 94 and 96). The first base rail 84 may form the first linkage side 62, and extend longitudinally between the first linkage end 58 and the second linkage end 60. The second base rail 86 may form the second linkage side 64, and extend longitudinally between the first linkage end 58 and the second linkage end 60. The cross rails (e.g., 88, 90, 92, 94 and 96) may be arranged within one or more of the linkage segments (e.g., 66, 68 and 70), and extend laterally between the first base rail 84 and the second base rail 86. The first cross rail 88 and the second cross rail 90, for example, may be configured with the first linkage segment 66. The third cross rail 92 and the fourth cross rail 94 may be configured with the second linkage segment 68. The fifth cross rail 96 may be configured with the third linkage segment 70. Referring to FIG. 5, the third cross rail 92 may include an intermediate segment 98 that extends laterally between a first end segment 100 and a second end segment 102. The intermediate segment 98 may include a (e.g., annular) rail sidewall that forms the panel mounting aperture 72.

The panel 54 extends longitudinally between a first (e.g., aft) panel end 104 and a second (e.g., forward) panel end 106. The panel 54 may include one or more panel segments such as, for example, a first (e.g., aft) panel segment 108, a second (e.g., intermediate) panel segment 110 and a distal third (e.g., forward) panel segment 112, which extend laterally between a first panel side 114 and a second panel side 116. The first panel segment 108 may extend longitudinally from the first panel end 104 to the second panel segment 110. The second panel segment 110 may extend longitudinally from the first panel segment 108 to the third panel segment 112. The third panel segment 112 may extend longitudinally from the second panel segment 110 to the second panel end 106.

Referring to FIG. 3, the first mounting pin 56 may include a linkage contact segment 118 that extends transversely between a panel mounting segment 120 and a distal end segment 122. Referring to FIG. 5, the linkage contact segment 118 may be configured with a (e.g., circular) cross-sectional geometry having a longitudinal pin length 124 (e.g., pin diameter). The pin length 124 may be less than the aperture length 82 (see FIG. 4).

Referring to FIGS. 3 and 5, the first panel segment 108 may be pivotally engaged with the first linkage segment 66. A panel mount 126, for example, may be (e.g., fixedly) connected to the first panel segment 108 at the first panel end 104. A second mounting pin 128 may extend through the panel mount 126 and the first linkage mounting aperture 74 to pivotally mount the first linkage segment 66 to the panel mount 126. The second mounting pin 128 may also pivotally mount the convergent seal 42 to, for example, a respective divergent seal 46 within the divergent exhaust nozzle section 50. The panel mounting segment 120 may be (e.g., fixedly) connected to the second panel segment 110. The first mounting pin 56 may extend through the panel mounting aperture 72, and the linkage contact segment 118 may be slidingly engaged with the rail sidewall of the intermediate segment 98. The third linkage segment 70 may be pivotally connected to the exhaust nozzle case 38 by a third mounting pin 130 extending through the second linkage mounting aperture 76.

Referring to FIG. 1, during engine operation, the convergent exhaust nozzle section 48 and/or the divergent exhaust nozzle section 50 may move between a first configuration (e.g., an unrestricted configuration as depicted by the solid line) and a second configuration (e.g., a restricted configuration as depicted by the ghost line). Referring to FIG. 3, the linkage contact segment 118 may move transversely (e.g., translate) within the panel mounting aperture 72, and the panel 54 may pivot about the second mounting pin 128. The second panel segment 110 therefore may move transversely relative to the second linkage segment 68 while, for example, maintaining a (e.g., substantially fixed) transverse spatial relationship between the first panel end 104 and the first linkage end 58. In this manner, (i) an end seal 132 connected to the second panel end 106 may maintain a seal with, for example, a seal land 134 on the exhaust nozzle case 38 and/or (ii) the first panel end 104 may be accurately positioned relative to the divergent exhaust nozzle section 50 as the nozzle sections move between the first and second configurations.

Figure 6:
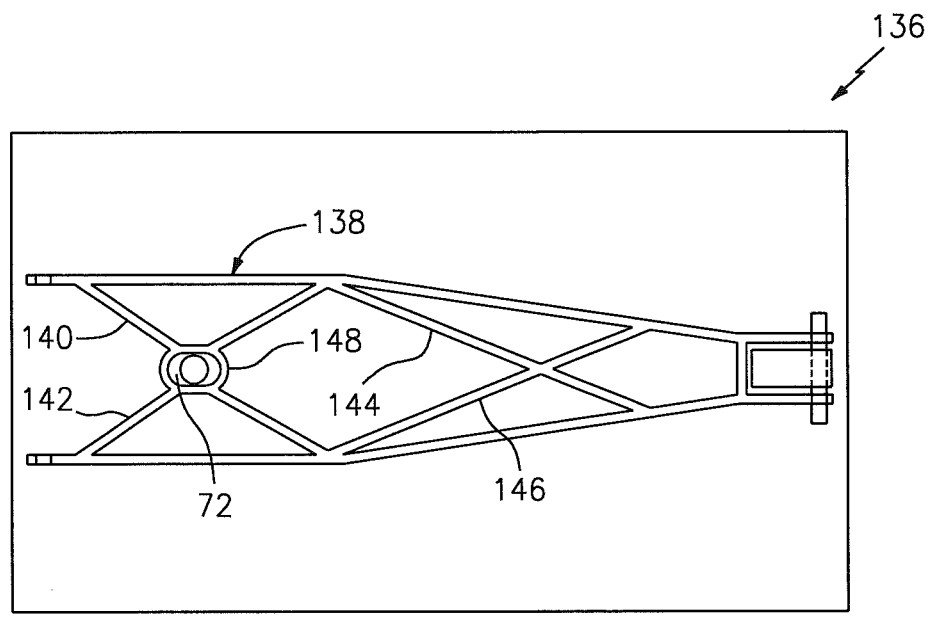
FIG. 6 is a top view illustration of another exhaust nozzle flap linkage configured with an exhaust nozzle flap panel.

FIG. 6 is a top view illustration of an exhaust nozzle flap 136 (e.g., a convergent seal) that includes an alternative exhaust nozzle flap linkage 138 (e.g., tapered seal linkage). In contrast to the linkage 52 in FIG. 5, cross rails (e.g., 140, 142, 144, 146) included in the linkage 138 may be configured into a (e.g., cross) support truss. A first of the cross rails 140 may intersect a second of the cross rails 142 and form a (e.g., annular) rail sidewall 148 that forms the panel mounting aperture 72.

Figure 7:
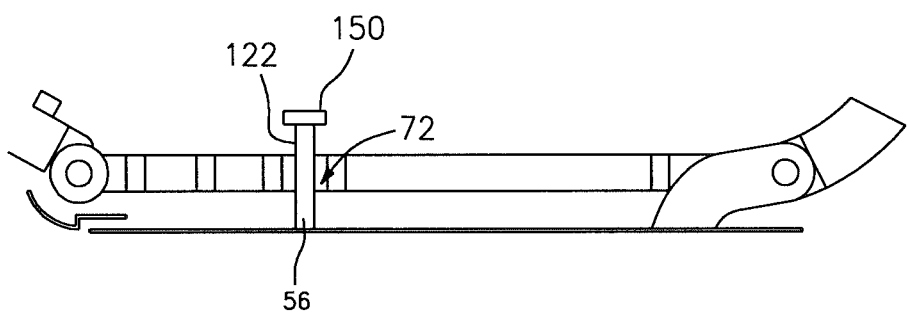
FIG. 7 is a side-sectional illustration of an exhaust nozzle flap.

Referring to FIG. 3, in some embodiments, a transverse height of the first mounting pin 56 may be sized to prevent the pin from disengaging with (e.g., slipping out of) the panel mounting aperture 72 during engine 10 operation. Referring to FIG. 7, in other embodiments, a cap 150 (or any other type of retainer) may be connected to the distal end segment 122 in order to prevent the first mounting pin 56 from disengaging with the panel mounting aperture 72.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine exhaust nozzle, comprising:
   a plurality of exhaust nozzle flaps arranged circumferentially around a centerline, a first of the plurality of exhaust nozzle flaps comprising a linkage body, a panel and a mounting pin;
   wherein the linkage body comprises a first linkage segment that extends longitudinally from a linkage end to a second linkage segment, and a mounting aperture that extends transversely through the second linkage segment;
   wherein the panel comprises a first panel segment that extends longitudinally from a panel end to a second panel segment, and the first panel segment is pivotally engaged with the first linkage segment; and
   wherein the mounting pin extends through and moves transversely within the mounting aperture, and the mounting pin is connected to the second panel segment;
   wherein the first of the plurality of exhaust nozzle flaps comprises a convergent seal that is arranged circumferentially between and sealingly engaged with a second of the plurality of exhaust nozzle flaps and a third of the plurality of exhaust nozzle flaps.

2. The exhaust nozzle of claim 1, wherein
   the second panel segment moves transversely relative to the second linkage segment; and
   the panel end is substantially transversely fixed relative to the linkage end.

3. The exhaust nozzle of claim 1, wherein the mounting aperture comprises a longitudinally elongated cross-sectional geometry with a longitudinal aperture length, and the mounting pin comprises a longitudinal pin length that is less than the longitudinal aperture length.

4. The exhaust nozzle of claim 1, further comprising a panel mount connected to the first panel segment, wherein the first linkage segment is pivotally mounted to the panel mount.

5. The exhaust nozzle of claim 1, wherein
the linkage body further comprises a first cross rail that extends laterally between a first base rail and a second base rail;
the mounting aperture is arranged with the first cross rail; and
the first base rail and the second base rail extend longitudinally between the linkage end and a second linkage end.

6. The exhaust nozzle of claim 5, wherein the first cross rail is one of a plurality of cross rails included in the linkage body, and the first cross rail is arranged longitudinally between a second of the plurality of cross rails and a third of the plurality of cross rails.

7. The exhaust nozzle of claim 1, wherein
the linkage body further comprises a plurality of cross rails that extend laterally between a first base rail and a second base rail;
the plurality of cross rails are arranged together to form a support truss, and the mounting aperture is arranged with at least one of the plurality of cross rails; and
the first base rail and the second base rail extend longitudinally between the linkage end and a second linkage end.

8. A turbine engine exhaust nozzle, comprising:
a convergent exhaust nozzle section connected between an exhaust nozzle case and a divergent exhaust nozzle section, wherein the convergent exhaust nozzle section comprises a plurality of exhaust nozzle flaps arranged circumferentially around a centerline;
a first of the plurality of exhaust nozzle flaps comprising a linkage, a panel and a mounting pin;
wherein the linkage comprises a first linkage segment that extends longitudinally from a linkage end to a second linkage segment, and a mounting aperture that extends transversely through the second linkage segment;
wherein the panel comprises a first panel segment that extends longitudinally from a panel end to a second panel segment, and the first panel segment is pivotally engaged with the first linkage segment; and
wherein the mounting pin extends through and moves transversely within the mounting aperture, and the mounting pin is connected to the second panel segment.

9. The exhaust nozzle of claim 8, wherein
the linkage further comprises a third linkage segment that extends longitudinally between a second linkage end and the second linkage segment;
the panel further comprises a distal third panel segment that extends longitudinally between a second panel end and the second panel segment; and
the first linkage segment is pivotally connected to the convergent exhaust nozzle section at the linkage end, and the third linkage segment is pivotally connected to the exhaust nozzle case at the second linkage end.

10. An exhaust nozzle flap for a turbine engine, comprising:
an exhaust nozzle flap linkage comprising a first linkage segment that extends longitudinally from a linkage end to a second linkage segment, a mounting aperture that extends transversely through the second linkage segment, and a first cross rail that extends laterally between a first base rail and a second base rail, wherein the first base rail and the second base rail extend longitudinally between the linkage end and a second linkage end, and wherein the first linkage segment is fixedly connected to the second linkage segment, and wherein the mounting aperture is arranged with the first cross rail;
an exhaust nozzle flap panel comprising a first panel segment that extends longitudinally from a panel end to a second panel segment, the first panel segment pivotally engaged with the first linkage segment;
a mounting pin that extends through and moves transversely within the mounting aperture, the mounting pin connected to the second panel segment; and
wherein the first cross rail is one of a plurality of cross rails included in the exhaust nozzle flap linkage, and the first cross rail is arranged longitudinally between a second of the plurality of cross rails and a third of the plurality of cross rails.

11. The exhaust nozzle flap of claim 10, wherein
the second panel segment moves transversely relative to the second linkage segment; and
the panel end is substantially transversely fixed relative to the linkage end.

12. The exhaust nozzle flap of claim 10, wherein the mounting aperture comprises a longitudinally elongated cross-sectional geometry with a longitudinal aperture length, and the mounting pin comprises a longitudinal pin length that is less than the longitudinal aperture length.

13. The exhaust nozzle flap of claim 12, wherein the elongated cross-sectional geometry comprises an oval cross-sectional geometry, and the pin comprises a circular cross-sectional geometry.

14. The exhaust nozzle flap of claim 10, wherein the exhaust nozzle flap panel comprises a heat shield.

15. The exhaust nozzle flap of claim 10, further comprising a panel mount connected to the first panel segment, wherein the first linkage segment is pivotally mounted to the panel mount.

16. The exhaust nozzle flap of claim 10, wherein
the plurality of cross rails are arranged together to form a support truss.

17. The exhaust nozzle flap of claim 10, wherein
the exhaust nozzle flap linkage further comprises a distal third linkage segment that extends longitudinally between a second linkage end and the second linkage segment, and a second mounting aperture that extends laterally through the third linkage segment at the second linkage end; and
the exhaust nozzle flap panel further comprises a distal third panel segment that extends longitudinally between a second panel end and the second panel segment.

* * * * *